Patented July 3, 1923.

1,460,708

UNITED STATES PATENT OFFICE.

WILLIAM M. DEHN, OF SEATTLE, WASHINGTON.

PROCESS OF MANUFACTURING DIAZODINITROPHENOL.

No Drawing. Application filed December 9, 1919. Serial No. 343,592.

*To all whom it may concern:*

Be it known that I, WILLIAM M. DEHN, a citizen of the United States, and a resident of Seattle, county of King, and State of Washington, have invented certain new and useful Improvements in Processes of Manufacturing Diazodinitrophenol, of which the following is a specification.

The invention relates to the manufacture of diazodinitrophenol (4.6-dinitro-2-diazophenol).

In the manufacture of diazodinitrophenol, nitrous acid ($N_2O_3$) has hitherto been passed as a gas, either into alcohol solutions of picramic acid or into ether solutions of the same, or into aqueous nitric acid solutions of the same. The alcohol method has hitherto yielded the best results. Because the aqueous nitric acid method yielded bad admixtures with picric acid and dinitroglucinol, it was abandoned by Griess and others for the alcohol method.

According to the present invention, ammonium picramate instead of free picramic acid is employed and the uses of gaseous nitrous acid and organic solvents are dispensed with. The ammonium picramate is reacted upon by substantially anhydrous nitric acid, in the presence of a reducing agent, such as the alcohols, the sugars and the like. In this way oxidation of ammonium picramate or of free picramic acid to picric acid is avoided, and substantially quantitative yields of diazodinitrophenol are obtained.

It is believed that the enhanced yields can be accounted for by the formulas:

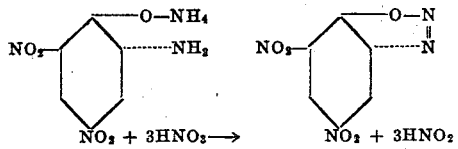

wherein it will be observed that the hydrogen atoms attached to the two nitrogen atoms are oxidized so as to yield the diazodinitrophenol directly. The nitrous acid in statu nascendi then further promotes the formation of the same compound. The high yields with ammonium picramate, instead of with free picramic acid, and the practical absence of ammonium nitrate in the filtrates indicate the above course of reactions.

Fuming nitric acid is preferably employed of about 1.5 specific gravity. The use of such acid presents numerous features of advantage, including high concentration and oxidizing power, good solvent properties, limited hydrolyzing influence and ready capacity to yield nascent nitrous acid. An excess of the acid is desirable to reduce hazards of combustion and explosion, but this excess is kept low, and is ultimately removed so that the precipitation of diazodinitrophenol by water may be as complete as possible. The ammonium picramate is always added to the acid so that an excess of nitric acid may always be present.

Without a reducing agent for the nitric acid the diazodinitrophenol is invariably contaminated with picric acid, because of the chemical reaction:

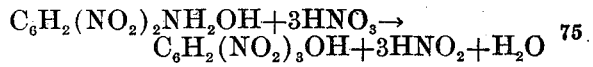

As indicated above, the ammonium picramate itself serves as such a reducing agent, but better results are obtained through the use of an additional reducer, such as the alcohols, the carbohydrates, and the like. Alcohol thus used in small quantities as a reducer must not be confused with alcohol used as a solvent in previous methods of manufacture of diazodinitrophenol, since the alcohol here used can be substituted by carbohydrates, etc.

A floating layer of high boiling paraffine hydrocarbon oil is employed, such as kerosene or low melting paraffine wax. It is desirably free from aromatic compounds which would interfere with the reaction and result in production of impure diazodinitrophenol. The layer of oil is necessary to reduce spontaneous surface combustion of materials and, during the latter stages of the process, to eliminate hazard of explosion of the entire charge. Furthermore, the oily layer assists in the retention of the oxides of nitrogen. This protection from explosion by an oily layer in the manufacture of explosives, as far as I am aware, has not been employed hitherto.

The following example is given for the purpose of illustrating one way of carrying out my invention:

Fuming nitric acid of about 1.5 specific gravity is placed in a converter and is covered with neutral oil, preferably paraffine oil, such as kerosene, low melting paraffine wax, or the like, substantially free from aromatic compounds. Ammonium picramate is admixed with about one-fourth its weight of alcoholic material, as wood or grain alcohol or mixtures of alcohols, or with a similar quantity of sugar, or other carbohydrate, and the mixture is added to the nitric acid while agitating and controlling the temperature at such a rate that a minimum evolution of brownish fumes containing oxides of nitrogen results.

The quantities used (by weight) may be about as follows:

| | Parts. |
|---|---|
| Nitric acid of about 1.5 specific gravity | 100 |
| Paraffine hydrocarbons preferably more than | 200 |
| Ammonium picramate | 40 |
| Alcohol or carbohydrate | 10 |

The mixture may be permitted to stand or may be heated gradually up to about 100° C. until the evolution of gas ceases.

A brown-red lower layer, possibly containing yellow solid, and a clear upper layer of paraffine oil are thus obtained. For obvious reasons, the formation of solid diazodinitrophenol at this stage is to be avoided and if a tendency toward production of solid diazodinitrophenol is noted, evaporation may be reduced or more nitric acid may be added in order to avoid the formation of solid diazodinitrophenol.

The material is run into a separator and after standing for some time, the greater part of the paraffine layer is run off to be used again for new charges. The lower acid layer is run off as closely as practicable, and more or less of an intermediate layer is left to be mingled with subsequent changes from the converter.

The nitric acid solution of diazodinitrophenol, drawn off from the bottom of the separator, is run vertically in thin streams into stirred water, at such a rate that no large masses of solid or of oil separate. By this treatment a bright yellow powdery sediment is obtained and, after standing, may be decanted or filtered, washed with water and stored in contact with water, or dried at temperatures not exceeding 100° C. The yield thus obtained is over 90% of the theory. As the diazodinitrophenol so produced is substantially pure, no further treatment is required, but, if desired, it may be recrystallized, as by dissolving in nitrobenzene at 100° C. and letting cool, or by pouring warm acetone solutions of it into ether or into gasoline and letting stand, whereby gold-yellow rectangular flakes or leaflets of diazodinitrophenol are obtained.

The color of the aqueous filtrate may be used as an indication of the success of the process, since deep color is caused by picric acid, but diazodinitrophenol colors the water only slightly.

The aqueous filtrates may be evaporated to dryness and yield a mixture of diazodinitrophenol, picric acid, oxalic acid, etc., about equal to the remainder of the theoretical yield. The usual modes of separation and purification may be resorted to for the reclamation of this small proportion of the yield, if desired, but the bulk of the diazodinitrophenol produced is obtained practically free from picric acid in the manner described, and there is no occasion for resort to the troublesome step of separation.

While, for simplicity, I have described my invention as carried out with simple forms of apparatus and in batches it is to be understood that it may be performed in other ways and with any suitable apparatus, and that such changes and modifications as are included within the scope of my claims may be resorted to, without departing from my invention or sacrificing the advantages thereof.

I claim:

1. The process of making diazodinitrophenol, which comprises reacting on ammonium picramate with nitric acid substantially free from water in the presence of a reducing agent for the nitric acid by adding the ammonium picramate to the acid so as to maintain the acid in excess until the reaction is complete.

2. The process of making diazodinitrophenol, which comprises reacting on ammonium picramate with fuming nitric acid in excess of reactive requirements in the presence of a reducing agent for nitric acid.

3. The process of making diazodinitrophenol, which comprises reacting on ammonium picramate with nitric acid slightly in excess of reactive requirements of substantially 1.5 specific gravity in the presence of a reducing agent for nitric acid.

4. The process of making diazodinitrophenol, which comprises reacting on ammonium picramate with nitric acid of substantially the highest concentration in the presence of alcohol as a reducing agent for nitric acid, and covering the reacting materials with a layer of neutral oil to prevent combustion and explosion.

5. The process of making diazodinitrophenol, which comprises reacting on ammonium picramate with nitric acid in excess of reactive requirements of substantially the highest concentration in the presence of alcohol as a reducing agent by adding the ammonium picramate slowly to the acid, and precipitating the reaction product in water.

6. The process of making diazodinitrophenol, which comprises reacting on ammonium picramate, with nitric acid of about 1.5 specific gravity in the presence of a reducing agent for nitric acid, and covering the reagents with a layer of neutral oil, separating the reaction product from the oil, and precipitating the reaction product in water.

7. The process of making diazodinitrophenol, which comprises reacting on ammonium picramate with nitric acid of substantially the highest concentration in the presence of a reducing agent for nitric acid, covering the reagents with a layer of neutral hydrocarbon oil, separating the reaction product in liquid form from the oil, as by gravity separation, and entering such liquid reaction product into water in a finely divided state, whereby diazodinitrophenol is precipitated in solid form.

8. The process of making diazodinitrophenol, which comprises reacting on ammonium picramate with fuming nitric acid of substantially 1.5 specific gravity in the presence of alcohol as a reducing agent for nitric acid, protecting the reagents with a top layer of neutral oil, separating the reaction product in liquid form from the oil, entering same in a finely divided state into water, collecting the precipitated material and purifying same by crystallizing from solution.

9. The process of making diazodinitrophenol, which comprises the step of reacting on ammonium picramate with nitric acid slightly in excess of reactive requirements in the presence of material adapted to react with the nitric acid to form nascent nitrous acid by adding the ammonium picramate and said material simultaneously to the acid at a slow rate.

10. The process of making diazodinitrophenol, which comprises reacting on ammonium picramate with the reaction product of nitric acid and a reducing agent therefor consisting of alcohol, the nitric acid being present slightly in excess of reactive requirements.

11. The process of making diazodinitrophenol, which consists in reacting with an excess of nitric acid on a mixture of ammonium picramate and a reducing agent for nitric acid, raising the mixture to approximately 100° C. and maintaining said temperature whereby nitrous acid is produced, and the ammonium picramate thereby converted into diazodinitrophenol without expelling an excess of nitric acid.

12. The process of making diazodinitrophenol, which consists in covering a body of nitric acid of about 1.5 specific gravity with a layer of neutral oil, and introducing simultaneously ammonium picramate and a reducing agent for nitric acid into the acid through the oil layer, the rate of addition and the temperature of the reagents being kept sufficiently low to avoid the copious evolution of red fumes.

13. In the process of making diazodinitrophenol from ammonium picramate, the step which comprises introducing such material mixed with a reducing agent for nitric acid through a top layer of oil into a body of nitric acid of substantially 1.5 specific gravity.

14. The process of making diazodinitrophenol, which consists in entering ammonium picramate admixed with a reducing agent for nitric acid, into a body of nitric acid, through a protective layer of paraffine oil, regulating the rate at which the material is added and controlling the temperature so that evolution of red fumes is reduced to substantially the minimum.

15. The process of making diazodinitrophenol, which comprises introducing into a converter about 100 parts of fuming nitric acid of substantially 1.5 specific gravity, covering same with at least 200 parts of a paraffine oil free from aromatic compounds, introducing into the acid through the oil, a mixture of about 40 parts ammonium picramate and about 10 parts grain alcohol, while agitating and controlling the temperature so that copious production of red fumes is avoided, separating the reaction mixture from the oil, and entering same in liquid form and in a thin stream into water, whereby the diazodinitrophenol is precipitated in solid form.

In testimony that I claim the foregoing, I hereto set my hand, this 17th day of November, 1919.

WILLIAM M. DEHN.